United States Patent [19]

Flytani-Stephanopoulos et al.

[11] Patent Number: 4,729,889
[45] Date of Patent: Mar. 8, 1988

[54] HIGH TEMPERATURE REGENERATIVE $H_2S$ SORBENTS

[75] Inventors: Maria Flytani-Stephanopoulos, Pasadena; George R. Gavalas, Altadena, both of Calif.; Satish S. Tamhankar, Scotch Plains, N.J.

[73] Assignee: California Institute of Technology, Pasadena, Calif.

[21] Appl. No.: 717,333

[22] Filed: Mar. 29, 1985

[51] Int. Cl.[4] .................. C01F 7/02; C01G 49/02
[52] U.S. Cl. ........................ 423/593; 423/594; 423/599; 423/600; 423/604; 423/606; 423/622; 423/625; 423/632; 502/400; 502/406; 502/415
[58] Field of Search ............ 502/406, 415, 502, 517, 502/307, 316, 318, 308, 323, 353, 354, 324, 331, 346, 524, 525; 423/210.5, 213.5, 236, 231, 593, 594, 604, 606, 622, 632, 599, 600

[56] References Cited

U.S. PATENT DOCUMENTS

| | | | |
|---|---|---|---|
| 3,124,452 | 3/1964 | Kraft | 75/65 R |
| 3,403,112 | 9/1968 | Sze et al. | 502/316 |
| 3,417,145 | 12/1968 | Nemec et al. | 502/318 |
| 3,526,675 | 9/1970 | Croce et al. | 502/324 |
| 3,567,793 | 3/1971 | Colling et al. | 502/324 |
| 3,686,347 | 8/1972 | Dean et al. | 502/324 |
| 3,716,497 | 2/1973 | Courty | 502/316 |
| 3,855,388 | 12/1974 | Rosinski | 502/318 |
| 3,925,259 | 12/1975 | Kane | 502/318 |
| 3,954,938 | 5/1976 | Meissner | 423/210.5 |
| 4,069,171 | 1/1978 | Lemkey et al. | 502/323 |
| 4,086,264 | 4/1978 | Brooks et al. | 502/318 |
| 4,089,809 | 5/1978 | Farrior, Jr. | 502/406 |
| 4,197,277 | 4/1980 | Sugier et al. | 423/573 G |
| 4,207,209 | 6/1980 | Matsuda et al. | 502/406 |
| 4,293,444 | 10/1981 | Parthasarathy | 502/307 |
| 4,313,820 | 2/1982 | Farha, Jr. et al. | 423/230 |
| 4,442,078 | 4/1984 | Jalan et al. | 423/230 |
| 4,455,286 | 6/1984 | Young et al. | 423/230 |
| 4,470,958 | 9/1984 | Van Gelder et al. | 423/210.5 |
| 4,478,800 | 10/1984 | Van der Wal et al. | 423/231 |
| 4,489,047 | 12/1984 | de Jong et al. | 502/517 |
| 4,519,992 | 5/1985 | Alkhazov et al. | 423/231 |
| 4,539,101 | 9/1985 | Oleck et al. | 208/251 H |

OTHER PUBLICATIONS

Marcilly, C. et al, "Preparation of Highly Dispersed Mixed Oxides", J. Am. Ceramic Soc., 53, No. 1, 56 (1970).

*Primary Examiner*—Helen M. S. Sneed
*Assistant Examiner*—Anthony McFarlane
*Attorney, Agent, or Firm*—Marvin E. Jacobs

[57] ABSTRACT

Efficient, regenerable sorbents for removal of $H_2S$ from high temperature gas streams comprise porous, high surface area particles. A first class of sorbents comprise a thin film of binary oxides that form a eutectic at the temperature of the gas stream coated onto a porous, high surface area refractory support. The binary oxides are a mixture of a Group VB or VIB metal oxide with a Group IB, IIB or VIII metal oxide such as a film of V-Zn-O, V-Cu-O, Cu-Mo-O, Zn-Mo-O or Fe-Mo-O coated on an alumina support. A second class of sorbents consist of particles of unsupported mixed oxides in the form of highly dispersed solid solutions of solid compounds characterized by small crystallite size, high porosity and relatively high surface area. The mixed oxide sorbents contain one Group IB, IIB or VIIB metal oxide such as copper, zinc or manganese and one or more oxides of Groups IIIA, VIB or VII such as aluminum, iron or molybdenum. The presence of iron or aluminum maintains the Group IB, IIB or VIIB metal in its oxidized state. Presence of molybdenum results in eutectic formation at sulfidation temperature and improves the efficiency of the sorbent.

10 Claims, 6 Drawing Figures

HIGH TEMPERATURE REGENERATIVE H2S SORBENTS

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435: 42 USC 2457).

BACKGROUND OF THE INVENTION

The present invention relates to novel sorbents for high temperature regenerative removal of $H_2S$ from gas streams and, more particularly, gas streams resulting from the gasification of coal and heavy oil residues.

High temperature desulfurization of coal-derived fuel gas offers potential improvements on the thermal efficiency of systems using coal gasification such as power plants (high temperature fuel cells, combined cycle) and synthesis gas conversion plants (ammonia, methanol). Over the last ten years, several sorbents have been proposed and investigated for the regenerative removal of the main sulfur compound, i.e., hydrogen sulfide, from fuel gas at high temperatures. The level of $H_2S$ removal needed depends on the end use of the fuel gas. For power plant combustion purposes, removal down to about 100 ppm is adequate, but for molten carbonate fuel cell applications removal down to a level of 1 ppm may be required.

List of Prior References

1. "Chemistry of Hot Gas Cleanup in Coal Gasification and Combustion," MERC Hot Gas Cleanup Task Force. MERC/SP-78/2, Feb. 1978.
2. "Studies Involving High Temperature Desulfurization/Regeneration Reactions of Metal Oxides for the Fuel Cell Program," Final Report to DOE, Contract No. 31-109-38-5804, by Giner, Inc., Waltham, Mass., Feb. 1981.
3. Westmoreland, P. R., Gibson, J. B., and Harrison, D. P., Environ. Sci. Technol. 11, 488 (1977).
4. Westmoreland, P. R. and Harrison, D. P., Environ. Sci. Technol. 10, 659 (1976).
5. Grindley, T. and Steinfeld, G., "Development and Testing of Regenerable Hot Coal Gas Desulfurization Sorbents," METC, DOE/MC/16545-1125, Oct. 1981.
6. Anderson, G. L. and Garrigan, P. C., "Gas Processing Technology for Integrating Coal Gasifiers with Molten Carbonate Fuel Cells." Paper presented at the Electrochemical Society Meeting, Montreal, Quebec, Canada, May 10–12, 1982.
7. Stegen, G. E., "Development of a Solid Absorption Process for Removal of Sulfur from Fuel Gas." Final Report DE-AC21-79ET11028 Battelle, Pacific Northwest Laboratories, Mar. 1982.
8. Pollard, A. J., "Proposed Phase Diagram for the System Vanadium Pentoxide-Zinc Oxide." U.S. Naval Research Lab., NRL Rep. 5960, Washington, D.C., July 1963.
9. Cirilli, V., Burdese, A., and Brisi, C., Atti. Accad. Sci. Torino 95, 15 (1961).
10. Kuney, D. K., Belyaevskaya, L. V., and Zelikman, A. N., Russian J. of Inorganic Chemistry 11. 1063 (1966)
11. Longo, J. M., Horowitz, H. S. and Clavenna, L. R., "A Low Temperature Route to Complex Oxides." Advances in Chemistry Series No. 186, p. 139, American Chemical Society, Washington, D.C., 1980.
12. Singh, B. N., Banerjee, R. K., and Arora, B. R., J. Thermal Analysis 18, 5 (1980).
13. Kolta, G. A., El-Tawil, S. Z., Ibrahim, A. A. and Felix, N. S., Thermochim. Acta 36, 359 (1980).
14. Marcilly, C., Courty, P. and Delmon, B., J.Am. Ceramic Soc. 53, No. 1, 56 (1970).
15. U.S. Pat. No. 1,851,312, W. J. Huff.
16. U.S. Pat. No. 2,019,468, T. S. Bacon.
17. U.S. Pat. No. 2,551,905, S. P. Robinson.
18. U.S. Pat. No. 3,429,656, W. F. Taylor et al.
19. U.S. Pat. No. 3,739,550, Kruel Martin et al.
20. U.S. Pat. No. 4,197,277, Andre Sugier et al.
21. U.S. Pat. No. 4,207,209, Sinpei Matsuda et al.
22. U.S. Pat. No. 4,283,380, Robert Voirin et al.
23. U.S. Pat. No. 4,310,497, Andre Deschamps et al.
24. U.S. Pat. No. 4,455,286, J. E. Young et al.
25. Barrin, I. and Knacke, O., "Thermochemical Properties of Inorganic Substances," Springer Verlag, 1973.

Discussion of the Prior Art

The thermodynamics of various sorbents have been analysed in (1) and (2) among other reports. Comprehensive surveys of experimental work encompassing various high temperature sorbents have also been published (1–7).

The overall performance of a sorbent depends on a variety of properties. Thermodynamics and kinetics of sulfidation are obvious factors, for they determine the overall sulfur capacity before breakthrough of some predetermined determined level of $H_2$. Kinetics encompasses the rates of purely chemical steps as well as the rate of pore diffusion and, more crucially, diffusion in the sulfide product layer. Surface area and pore size distribution are very important sorbent properties as they determine the rate of these diffusional processes. Zinc oxide, one of the most promising and widely studied sorbents, has very high equilibrium constant for sulfidation but in its unsupported form it suffers from slow kinetics limiting its sulfidation capacity. Iron oxide, on the other hand, has rapid kinetics but its equilibrium constant for sulfidation is not adequate for the degree of $H_2S$ removal required in the molten carbonate fuel cell application.

The other important sorbent properties refer to stability or regenerability in extended use, the operating conditions required for regeneration, and the composition of the regeneration off-gas, which largely determines the choice of a downstream sulfur recovery process. Using zinc oxide as an example again, it is well known that evaporative loss of metallic zinc places an upper limit on the sulfidation temperature. Loss of surface area during regeneration places a lower limit on regeneration temperature or necessitates a more complicated regenerative treatment. The regeneration off-gas, including sulfur dioxide, hydrogen sulfide and elemental sulfur, requires further treatment for sulfur recovery. When the yield of elemental sufur is sufficiently high, sulfur recovery can be simplified with significant overall cost benefits (6).

These references emphasize the need for improved sorbents for the high temperature desulfurization of coal-derived gas streams In the U.S. patents listed above Young et al (24) is the most relevant in disclosing the use of CuO and ZnO mixtures as high temperature (500°-700° C.) regenerable sorbent for H₂S in a hot gas stream fuel for a fuel cell. These mixtures are not molten during any stage of the desulfurization process and do not provide effective sulfur capacity or regenerability. Robinson (17) also discloses desulfurization of a gas at high temperature. 1000° F. pebbles of refractory material heat the gas from 300° to 750° F. The pebbles are regenerated with hot air or air/steam mixtures.

The remaining U.S. patent references disclose various regenerable H₂S sorbents. Huff (15) discloses mixtures of CuO with an oxide of a Group V or VI metal to desulfurize a combustible gas at a temperature above 200° C. in the presence of oxygen. Sugier (20) desulfurized gases containing H₂S, CS₂, COS or mercaptans with mixtures of vanadium oxide and iron oxide on alumina support at temperatures of 150° C. to 200° C. Matsuda et al (21) sinter titanium, molybdenum oxide and one of numerous active metal oxides to form a desulfurization sorbent. Voirin et al (22) absorb sulfur oxide-containing gases in alumina, carrying a salt or oxide of a metal and then regenerated the sorbent with H₂S at 250° C. to 450° C. Martin et al (19) desulfurize a CO₂ containing waste gas with a regenerable carbon-sorbent containing a mixture of vanadium with K, Li or Ba and optimally Al, Cr, Si or P. Taylor et al (18) disclose a porous solid catalytic element for oxidizing sulfur and carbon oxides in automobile exhaust gas. The catalytic material can be at least one of manganese, copper, or vanadium oxide interspersed with alumina and sodium oxide.

With several of the thermodynamically favorable, high temperature H₂S sorbents reported to date, slow rates of reaction and pore diffusion, sintering, and pore plugging limit sorbent capacity and degree of purification under practical conditions. Such is the case with some commercial ZnO sorbents where reported conversions at breakthrough were less than 20 percent.

Recent research has shifted from pure to mixed metal oxides with the goal of improving sorbent performance. For example, zinc ferrite has been found to possess better capacity and regenerability than pure zinc oxide (5). Mixed ZnO-CuO has been studied for its better resistance to surface area loss (24) and various other mixtures including ZnO-Cr₂O₃ and ZnO-Al₂O₃ have been studied with the objective of increasing the yield of elemental sulfur during regeneration (6). Mixed oxides form various distinct crystalline phases or solid compounds, and should generally possess different thermodynamic properties and reactivity with respect to reduction, sulfidation, and regeneration reactions. This has so far received limited attention.

STATEMENT OF THE INVENTION

More efficient, regenerable H₂S sorbents for high temperature use have been provided in accordance with the invention. The sorbents exhibit improved chemical stability in avoiding metal loss and undesirable reduction at high temperatures and improved retention of pore volume and resistance to pore plugging whether supported or unsupported. Rapid kinetics of absorption and good sorbent regenerability are achieved during operation at 500°-700° C. Rapid absorption rates are achieved by eliminating or minimizing the resistance associated with solid state diffusion.

The sorbents of the invention remove H₂S from hot gas streams to levels well below the target levels. The high sulfur capacity, limited surface area loss, high stability and good regnerability of the sorbents are attributable to their improved physical characteristics. Improved thermodynamic properties are indicative of synergistic chemical effects in the mixed sorbents of the invention. The novel sorbents of the invention are characterized by improved sorbent utilization, high H₂S removal efficiency and better sorbent stability.

The sorbents of the invention are formed of porous, high surface area particles. A first class of sorbents are binary oxide mixtures such as Group VB or VIB with Group IIB or IB or VIII metal oxides, deposited on a high surface area refractory support. The binary oxides form a mixture that melts within the temperature range of H₂S removal, usually from 400° C. to 750° C., more usually from 500° C. to 700° C. The sorbent melts, coating the pores of the support with a thin film at the inception of the sulfidation period. During sulfidation simultaneous formation of a Group IB or IIB or VIII sulfide and reduction of the Group VB or VIB to a lower metal oxide valent oxide may take place. As sulfidation progresses the melt is gradually converted to a microcrystalline mixture of the metal sulfide and oxide. The reduced metal oxide chemiaorbs H₂. Thus, both components of the coating absorb H₂S which increases total capacity. An example is the ZnO-V₂O₅ mixture. During sulfidation, zinc forms ZnS and V₂O₅ forms lower oxides which chemisorb H₂S. During regeneration by a mixture of O₂ and H₂O, the zinc component is converted back to ZnO while the vanadium component to V₂O₅ restoring the sorbent to its original molten state. Restoring the melt after each regeneration prevents loss of surface area and absorptive capacity associated with unsupported solid ZnO sorbents.

The second class of high temperature sorbents consists of unsupported mixed oxides forming highly dispersed solid solutions or solid compounds characterized by small crystallite size, high porosity and relatively high surface areas. The sorbent is a mixture of Cu, Zn or Mn oxides with one or more of Al, Fe or Mo oxides. The presence of a preponderant amount of Al allows Cu and possibly Zn or Mn also to remain in the oxidized state which maximizes H₂S absorption characteristics. The sorbents are prepared in a special manner which provides the sorbent in a highly porous form with a range of pore sizes. The prevents fouling of the sorbent during absorption and/or regeneration cycles.

Both classes of sorbents exhibit high H₂S removal efficiency, stable conversion, minimal pore plugging and good regenerability. Synergistic effects and improved thermodynamics are displayed by the mixed oxides as compared to the pure oxides.

These and many other features and attendant advantages of the invention will become apparent as the invention becomes better understood by reference to the following detailed description when considered in conjunction with the accompanying drawings.

DETAILED DESCRIPTION OF INVENTION

Figure 1:
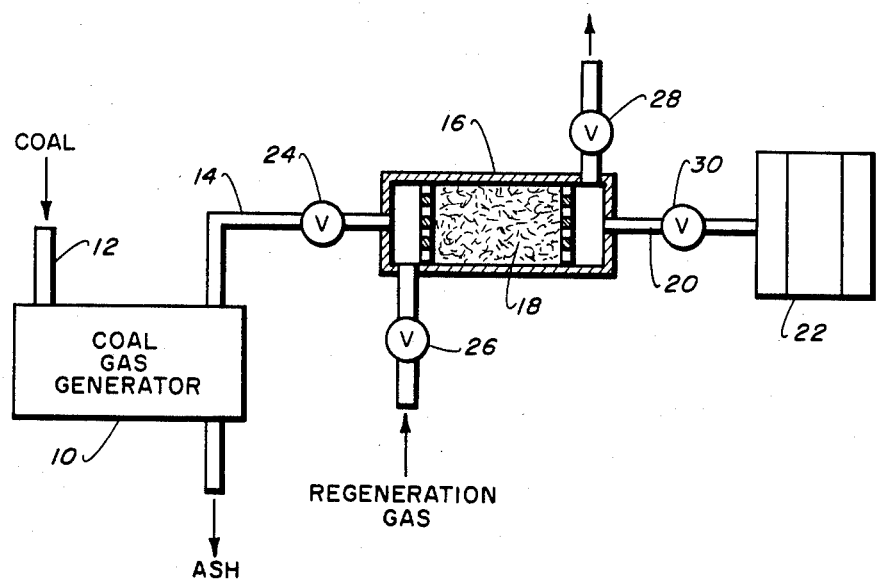
FIG. 1 is a schematic view of a system for producing, cleaning, and utilizing a hot $H_2S$-containing coal gas.

The $H_2S$ sorber can be utilized in the system illustrated in FIG. 1. A hot gas is produced in coal gas generator 10 by the gasification of coal fed to the inlet 12. The coal gas generally contains from 1000 to 10,000 ppm $H_2$. The coal gas at a temperature usually from 500° C. to 750° C. is fed through outlet line 14 to the $H_2S$ sorber 16 containing a bed 18 of porous sorbent. In one stage the sorber reduces the $H_2S$ content to less than 100 ppm, usually less than 5 ppm. The clean fuel gas is then fed through line 20 to the next unit 22 which can be a molten carbonate fuel cell, gas turbine generator or a chemical synthesis plant.

When the bed 18 of sorbent is exhausted, valves 24 and 30 are closed and valves 26 and 28 are opened. A stream of regeneration gas containing oxidation agents such as oxygen and steam passes through the bed and strips sulfur from the metal sulfides and reoxidizes the metal ions to regenerate the sorbent.

The chemistry of a complete sulfidation-regeneration cycle may be represented by the overall reactions:

reduction

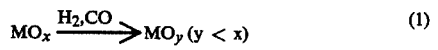  (1)

sulfidation

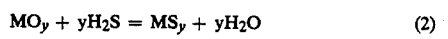  (2)

regeneration

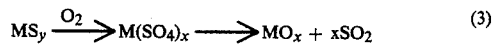  (3)

where M is a metal selected from Fe, Cu, Zn, etc.

Reduction and sulfidation take place simultaneously when the sorbent is contacted with the hot fuel gas. Regeneration can be conducted by air or an air-steam mixture where chemistry is more complicated than shown by reaction (3), with elemental sulfur and $H_2S$ produced in addition to $SO_2$.

When reaction and diffusion rates are sufficiently rapid, the sorbent sulfur capacity and the extent of purification are determined by thermodynamics alone. With many sorbents, however, the rate of reaction, pore diffusion, or diffusion in the product layer, limit sorbent capacity and degree of purification under practical conditions.

A. Supported Molten Mixed Oxide Sorbents

In the first class of sorbents developed in this invention, a thin film of mixed metal oxide sorbents is coated onto the surface of a porous, high surface area refractory support such as alumina or zirconia. The film becomes molten under conditions of sulfidation. The ratio of the Group I or II metal to the Group V or VI can be ±5 atomic percent from the eutectic point or slightly above. Representative eutectic forming films comprise V-Zn-O, V-Cu-O, Cu-Mo-O, Zn-Mo-O or Fe-Mo-O. During sulfidation, the sorbent will be converted to a mixture of a well dispersed crystalline phase and a melt (perhaps incorporating some sulfide and dissolved $H_2S$). By the end of sulfidation, much or all of the sorbent will be in microcrystalline form, which will be brought back to the molten mixed oxide state upon oxidative regeneration.

The characteristics of this class of sorbents are large surface area and small crystallite size. These two properties are expected to improve the kinetics of absorption. In addition, synergistic effects may be present whereby the $H_2S$ removal efficiency of the sorbent is superior to the thermodynamic predictions for each of its pure solid oxide constituents.

Since formation of a thin film of molten oxide on the surface of the pores of the support during sulfidation is critical, the sorbent preparation technique is important. The metal oxide film is formed by dissolving water-soluble precursor salts containing the metals in the eutectic ratio in a minimum amount of concentrated ammonia hydroxide and distilled water. The compounds can be separately or simultaneously impregnated onto the support. Co-impregnation is found to be the preferred technique. The porous support is washed a few times in conc. ammonia hydroxide and dried slowly to 200° C. An approximately equal volume of the precursor solution to the pore volume of the support is added to the support particles and the mixture stirred under vacuum. The mixture is then dried in air at elevated temperature usually 30° to 90° C. The impregnation-drying procedure is repeated until the loading of metal oxides on the support is from 10 to 60 weight percent usually from 20 to 40 weight percent. The support is then fully dried and calcined at a temperature above 300° C. in an oxidizing atmosphere to decompose the precursor salts and form a mixture of metal oxides.

Some examples of mixtures of binary oxides which form eutectics at temperatures below ~700° C. are shown in Table 1:

TABLE 1

EUTECTIC COMPOSITION AND MELTING POINT OF SELECTED BINARY OXIDE SYSTEMS

| ACTIVE SORBENT | EUTECTICS MOLE RATIO | FUSION, °C. |
|---|---|---|
| $ZnO/V_2O_5$ (8) | 0.98/1 | 661 |
| $CuO/V_2O_5$ (9) | 0.99/1 | 702 |
| $ZnMoO_4/MoO_3$ (10) | 0.47/1 | 707 |
| $CuMoO_4/MoO_3$ (10) | 0.47/1 | 560 |
| $FeMoO_4/MoO_3$ (10) | 0.19/1 | 705 |

These sorbents exist as a melt coating the pores of alumina or other high temperature substrates used for catalysts. Properties of commercially available porous substrates are presented in Table 2:

TABLE 2

PHYSICAL PROPERTIES OF SUPPORT MATERIALS

| Property | MCB-alumina | UCI-alumina | Zirconia |
|---|---|---|---|
| Source | ALCOA F-1 alumina | United Catalysts, Inc. T-2432 | Alpha Products, Inc. |
| Bulk density (lb/ft$^3$) | 52 | 40 | 31 |
| Impurities (wt %) | 0.9 $Na_2O$, 0.08 $Fe_2O_3$, 0.09 $SiO_2$, 6.5 $H_2O$ (as loss on ignition) | 0.03 $Na_2O$, <0.01 each of $Fe_2O_3$, $SiO_2$, MgO, CaO, $K_2O$ and S. | 2 $Al_2O_3$, 0.1 $SiO_2$ |
| Particle Size | −30 + 40 mesh | −35 + 45 mesh | −35 + 45 mesh |
| Surface Area (m$^2$/g) | 240* 100** | 85* 86** | 52* 25** |
| Pore Volume # (cc/g) | 0.25–0.30 | 0.7 | 0.21 |
| Ave. Pore Size # (Å) | 600 | 350 | >300 |

*As received.
**Treated by heating to ~850° C. for 2–3 hrs., thorough washing with a conc. NH$_4$OH solution and slow drying to 200° C.

Although the ave. pore size is 600Å, this alumina has a bimodal size distribution with ~50% of 40–45Å pores.
Manufacturer's data.

traces of $NO_3$. Sorbents were prepared by either step-wise impregnation of Zn and V or co-impregnation.

The same sorbent impregnation technique described above was applied to all three supports to facilitate comparisons. The UCI-alumina was found to be more suitable than the MCB-alumina as a sorbent support because of its larger pore volume and average pore size. The zirconia support shown in Table 2 was used in a few tests only. The properties of sorbents prepared with the UCI-alumina and zirconia supports are listed in Table 3.

TABLE 3

SUPPORTED ZnO, $V_2O_5$ AND ZnO—$V_2O_5$ SORBENTS

| Property | Support | Method of Impregnation* | Zn, Wt % | V, Wt % | Surface Area (m$^2$/g) |
|---|---|---|---|---|---|
| CAT-3N | UCI-alumina | Co—impregnation | 1.33 | 2.00 | 86 |
| CAT-NZ | " | from zinc acetate | 1.69 | — | 84 |
| CAT-NZ2 | " | from zinc acetate (twice) | 3.20 | — | 69 |
| CAT-NV | " | from ammonium meta-vanadate (twice) | — | 2.24 | 93 |
| CAT-NV2 | " | from ammonium meta-vanadate (twice) | — | 1.88 | 93 |
| CAT-3N2 | " | co-impregnation | 2.06 | 3.20 | 81 |
| CAT-3N3 | " | co-impregnation | 1.26 | 2.70 | 84 |
| S-2 | zirconia | co-impregnation | 0.388 | 0.60 | 23 |

See Table 2.
*All impregnations were done in a conc. NH$_4$OH solution.

Experiments were conducted in a quartz microreactor system at approximately atmospheric pressure with a gas mixture containing 20 volume percent $H_2$, 0.2–0.4 volume percent $H_2S$, 0–7 volume percent $H_2O$, balance $N_2$. The gas hourly space velocity was in the range of 2000–3000 hr$^{-1}$.

EXAMPLE 1. ZnO-$V_2O_5$ Supported Sorbents

The precursor compounds used for zinc and vanadium are zinc acetate and ammonium metavanadate, respectively. Both decompose at about 200° C. to give the corresponding oxides, ZnO and $V_2O_5$. In a few tests zinc nitrate was used as a precursor. However, this decomposes at a higher temperature (400° C.) and requires further high temperature treatment to remove The experimental data for sulfidation are presented in plots of outlet $H_2S$ concentration as a function of normalized absorption time t/t*, with t denoting real time and t* a calculated time corresponding to 100 percent ZnO conversion. Neglecting the vanadium contribution to $H_2S$ absorption, breakthrough conversions of sorbents are calculated as moles of $H_2S$ retained/mole ZnO at the time when the outlet $H_2S$ concentration starts to increase rapidly. Before breakthrough, the outlet $H_2S$ level was always less than 1 ppm.

The MCB-alumina, after stabilization at the reaction temperature (700° C.), had a surface area of ~100 m²/g. When this alumina was impregnated with only ZnO, a drastic reduction in surface area was noticed, suggesting pore blockage by ZnO crystallites. On subsequent impregnation with $V_2O_5$, the surface area again increased indicating that due to the Zn-V complex formation a better dispersion of Zn is achieved. Tests with sorbents containing different Zn-V ratios revealed that around the eutectic composition the sorbent exhibits high $H_2S$ sorption capacity.

A number of tests were conducted with various $ZnO-V_2O_5$ sorbents supported on the MCB-alumina. With a proper sorbent preparation, high breakthrough sorbent conversion (0.60–0.70) was observed in the first cycle. However, in all cases, in subsequent cycles the conversion level rapidly dropped. From various observations it was concluded that the support pore structure plays a key role in stabilizing the sorbent performance. It was found that the MCB-alumina has a bimodal pore structure with most of its surface area and pore volume in pores smaller than 50 Å in size. This apparently caused some segregation and pore blockage, and thereby reduced accessibility of $H_2S$ to the unreacted zinc. A more open pore structure as provided by the UCI alumina can suppress this problem.

In dry sulfidation at 700° C., the CAT-NZ (2.1 weight percent ZnO, no $V_2O_5$) sorbent showed considerable loss of zinc by evaporation as did CAT-NZ2 which had a higher loading of ZnO. Tests with CAT-NV (4 weight percent $V_2O_5$, no ZnO) showed retention of 0.18 to 0.20 mol $H_2S$/mol $V_2O_5$. No loss of $V_2O_5$ was observed. However, some $SO_2$ was released during sulfidation, indicative of undesirable $V_2O_5$ reduction by $H_2S$.

Figure 2:
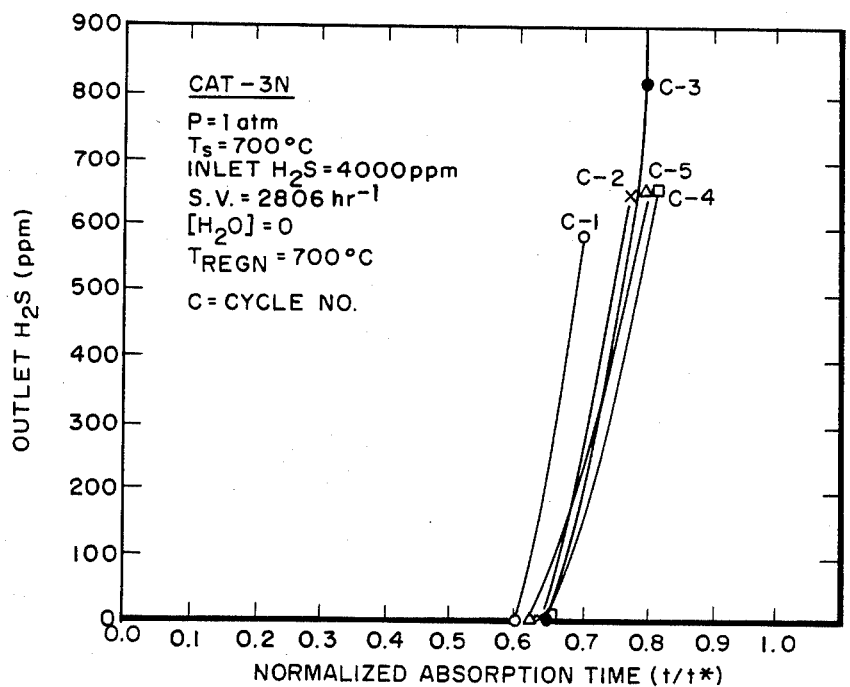
FIG. 2 is a set of breakthrough curves in successive sulfidation cycles of the CAT-3N sorbent (1.7 weight percent ZnO, 3.6 weight percent $V_2O_5$, balance $Al_2O_3$).

Tests with the CAT-3N sorbent containing the eutectic $ZnO/V_2O_5$ molar ratio of 51/49 showed a stable breakthrough conversion at about 0.65 over five cycles with a dry feed gas containing 4000 ppm $H_2S$. FIG. 2 shows the corresponding $H_2S$ breakthrough curves. This high and stable conversion indicates rapid kinetics, no metal loss, and little or no loss of surface area in successive cycles.

Regeneration of this sorbent was conducted with 1 volume percent $O_2$ in $N_2$ (no $H_2O$) at 700° C. Sulfur products included $H_2S$, $SO_2$ and elemental sulfur. Preceding the oxidative regeneration step, a nitrogen purge was used (also at 700° C.), upon which $H_2S$ and elemental sulfur were produced. The total amount of elemental sulfur in the sulfur products was as high as 50–65 volume percent.

Figure 3:
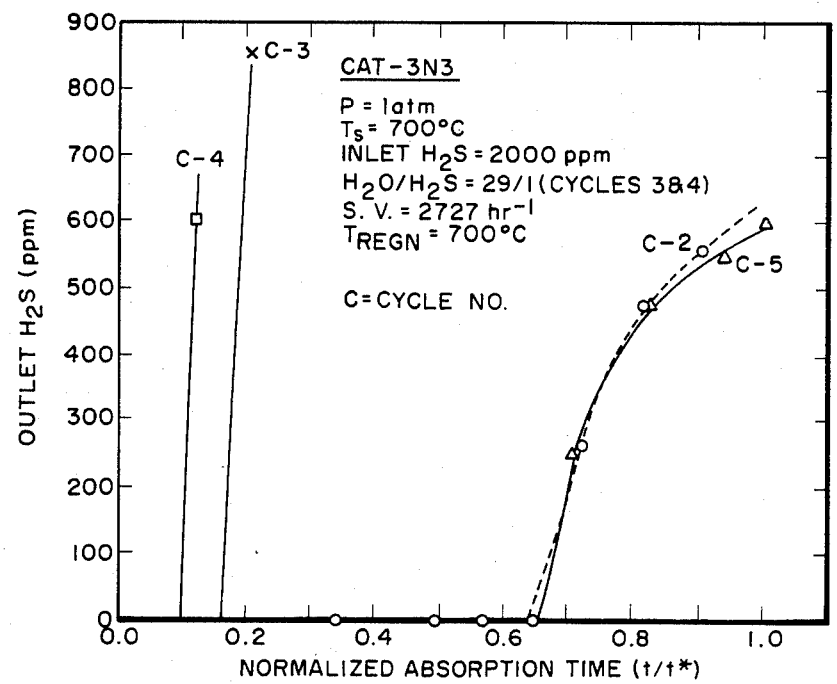
FIG. 3 is a set of breakthrough curves in successive sulfidation cycles of the CAN-3N3 sorbent (1.6 weight percent ZnO, 4.8 weight percent $V_2O_5$, balance $Al_2O_3$).

In a series of experiments with the vanadium-rich $ZnO-V_2O_5$ CAT-3N3 sorbent, the effects of steam addition in sulfidation and regeneration were examined. In dry sulfidation with 2000 ppm $H_2$, CAT-3N3 consistently gave breakthrough conversions of 0.64. However, as shown in FIG. 3, in the presence of $H_2O$ (6.7 volume percent), the breakthrough conversion was only 0.15. In this case, the total $H_2S$ retained by chemisorption on the sorbent was greatly reduced. This was shown by measuring $H_2S$ elution in nitrogen purge following sulfidation. These results indicate a competitive $H_2O-H_2S$ chemisorption mechanism.

As in the case of CAT-3N, the sorbent was also fully regenerable as shown by the breakthrough curves for cycles 2 and 5 in FIG. 3. These findings suggest that zinc is stabilized by vanadium in the alumina support, an important result from the standpoint of the overall performance of $ZnO-V_2O_5$ sorbents. Moreover, no surface area loss takes place during regeneration of these sorbents, apparently because the molten $V_2O_5.ZnO$ phase is restored at the end of each sulfidation/regeneration cycle.

Another finding from these tests refers to regeneration with steam. With steam and nitrogen mixtures (no oxygen), regeneration was very slow and remained incomplete. With air and steam together (1–5 volume percent $O_2$), both $H_2S$ and $SO_2$ were formed, and their yields went through maxima at different times. Elemental sulfur formation during wet regeneration was lower (by about ten times) amounting to ~5 mol percent of the sulfur products. Finally, it was later found that regeneration performed at the higher temperature of 750° C. eliminated zinc sulfate, which was formed to a limited extent at 700° C.

Sorbent S-2 (with 0.5 weight percent ZnO and 1.1 weight percent $V_2O_5$) was prepared by co-impregnation of the high surface area zirconia support described before. In sulfidation tests with S-2, the temperature used was 650° C. and the feed gas contained 20 volume percent $H_2$, 0.23 volume percent $H_2$, 2.3 volume percent $H_2O$, balance $N_2$. The first cycle resulted in a surprisingly high breakthrough conversion of about 0.80. Following sulfidation, desorption and regeneration steps were carried out. As in the case of dry sulfidation (e.g., CAT3N, CAT-NV), the amount of $H_2S$ retained by adsorption was about 20 percent of the total. This indicates that $H_2O/H_2S$ ratios up to 10/1 might be allowed before a drastic inhibition of $H_2S$ chemisorption (by $H_2O$) occurs.

In the second and following cycles a drop in the absorption capacity of the S-2 sorbent was observed, probably due to a pre-reduction step with a $H_2/N_2$ gas mixture. This pre-reduction was used in the beginning of the second cycle, upon which zinc metal could have been lost and the composition of the sorbent changed. The zirconia support used in the S-2 sorbent preparation may also have contributed to the observed instability of this sorbent.

The main features of the $ZnO-V_2O_5$ sorbents can be summarized as follows:

(1) In each sulfidation the initially existing molten sorbent phase disperses ZnO, $V_2O_x$, etc., better in the support. As a result, reproducible high breakthrough conversions (dry: 60–70 percent; w/steam: 10–40 percent) are obtained.

(2) Vanadium stabilizes ZnO in the alumina support.

(3) $H_2S$ is chemisorbed up to a level of 20 mol percent on $V_2O_x$ (no measurable sulfide formation occurs). At high $H_2O/H_2S$ ratios, the $H_2S$ uptake by vanadium is minimal apparently due to preferred adsorption of $H_2O$.

(4) Regeneration at high temperatures (up to 750° C.) is feasible without any loss of surface area (sintering) or active metal loss, and eliminates the formation of zinc sulfate.

(5) Dry regeneration produces about ten times more sulfur, and an important step in elemental sulfur formation is the catalytic decomposition of $H_2$.

(6) Since vanadium oxides do not appreciably contribute to $H_2S$ sorption, the overall sulfur capacity of ZnO-$V_2O_5$ sorbents is low. It may be increased if $V_2O_5$ is replaced by a reactive compound.

EXAMPLE 2. (Zn,Cu)-Mo-O Supported Sorbents

In view of the limitations of the ZnO-$V_2O_5$ Systems it was decided to explore the zinc and copper molybdates eutectics with $MoO_3$ melting, respectively, at 705° C. and 560° C. (10). Moreover, molybdenum is also known to react with $H_2S$ to form sulfides (mainly $Mo_2S_3$). Hence, the overall capacity was expected to be higher with these systems than with the Zn-V sorbents.

In a first experiment a eutectic melt was prepared by mixing powders of zinc molybdate ($ZnMoO_4$) and molybdenum oxide ($MoO_3$). After cooling, the solidified crystalline material was crushed to obtain a powder. This powder was mixed with the high suface area UCI-alumina and tested for its $H_2S$ absorption capacity. With a sulfidation gas containing 20 mol percent $H_2$, 1 mol percent $H_2$, 26 mol percent $H_2O$, balance $N_2$, a 1-15 percent breakthrough conversion (based on Zn and Mo) was obtained at test temperatures of 538° and 720° C. This was an encouraging result, given the fact that the eutectic melt was basically unsupported in this sorbent formulation.

Figure 4:
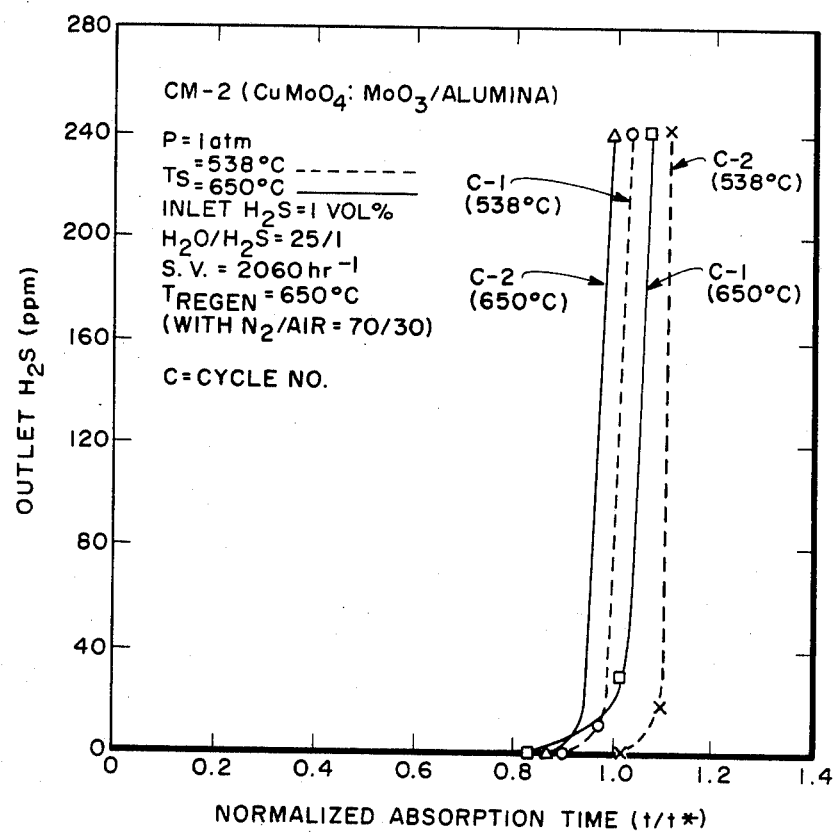
FIG. 4 is a set of breakthrough curves in sulfidation cycles of the CM-2 sorbent (5.1 weight percent CuO, 28.9 weight percent $MoO_3$, balance $Al_2O_3$).

In parallel work with porous, mixed oxide sorbents, it was discovered that copper oxide, which by itself is thermodynamically inferior to zinc oxide as a $H_2S$ sorbent shows superior behavior when combined with certain other oxides, as in copper ferrite. This, in conjunction with the fact that the eutectic in the Cu-Mo-O system is formed at a much lower temperature (560° C.) prompted testing of a supported Cu-Mo sorbent. This would also eliminate the sulfate formation problem associated with zinc-based sorbents because of the lower thermal stability of copper sulfate. Sorbent CM-2 was prepared by co-impregnation of copper carbonate and ammonium molybdate on alumina by an incipient wetness technique to obtain ~34 weight percent total loading. The amounts of CuO and $MoO_3$ in CM-2 were in the desired proportion (1 mol CuO: 3.125 mol $MoO_3$) for eutectic formation. The surface area of the fresh sorbent was ~53 $m^2/g$. X-ray diffraction (XRD) analysis of CM-2 identified $CuMoO_4$ and $Al_2O_3$ in the crystalline phase along with some poorly crystalline material. In tests with the CM-2 sorbent conducted both at 538° and 650° C. with $H_2O/ H_2S=25/1$, molar and $H_2O$ content as high as 25 mol percent, the sorbent conversion (based on both Cu and Mo) at breakthrough was ~25 percent, FIG. 4. A more significant result was that the outlet $H_2S$ level was less than 0.1 ppm until breakthrough. Regeneration was carried out at 650° C. with a 70 mol percent $N_2$-30 mol percent air mixture. The performance was stable in two cycles. XRD analysis of the sulfided sorbent identified $Cu_{1.96}S$, $MoO_2$ and $Al_2O_3$ in the crystalline phase. No evidence of molybdenum sulfides was found. Apparently, reduction of $MoO_3$ not followed by sulfidation takes place during reaction. Calculating the sorbent conversion in terms of Cu alone gives better than 90 percent conversion at breakthrough.

While no molybdenum sulfides are formed, the high $H_2S$ removal efficiency of this sorbent is attributed to the presence of Mo as well as Cu, since a complex copper molybdate (and perhaps sulfide) eutectic formed during sulfidation can retain additional amounts of $H_2S$. This explanation is offered for the sub-equilibrium $H_2S$ breakthrough levels observed with CM-2 as well as with bulk Cu-Mo-based sorbents.

During sulfidation of the CM-2 sorbent, limited evaporation of molybdenum was observed. The molybdenum loss (measured by atomic absorption (AA) analysis) was higher at 650° C. At 538° C., the loss of molybdenum was low, however, it was not completely eliminated. Tests with other Cu-Mo-based sorbents indicate that the molybdenum loss may be suppressed by using a different (copper-rich) sorbent composition which also increases the overall sulfur loading of the sorbent.

B. Unsupported Oxide Solid Solutions

The second class of high temperature sorbents according to the present invention consists of unsupported mixed oxides in the form of solid solutions or solid compounds. One instance of a successful mixed oxide system is the stoichiometric zinc ferrite spinel, which was found (5) to have properties superior to those of both iron and zinc oxides. It may not be necessary, however, to use a compound with definite stoichiometry and crystal structure. Thus, the second class of sorbents involves stoichiometric or non-stoichiometric mixed metal oxides [Zn-$Fe_x$-$O_y$, Cu-$Fe_x$-$O_y$, Cu-$(Al,Fe)_x$-$O_y$, Cu$(Mo,Al)_x$-$O_y$, etc.] prepared by special techniques as highly dispersed, microcrystalline solids. Their main attributes are high surface area (10-100 $m^2/g$) and large pore volume (1-3 cc/g) in unsupported form which are expected to provide rapid absorption and regeneration rates. While the thermodynamic properties of these solid solutions have not been determined, it is possible that they are superior to those of the pure components. Since these sorbents do not use an inert support, they should exhibit high capacity on a unit weight basis.

Several methods are described in the literature (11-14) for synthesizing highly dispersed mixed oxides. Early attempts to form high surface area metal oxide sorbents by precipitating mixed carbonates from homogenous salt solutions followed by drying and calcining resulted in materials of low surface area, about 5-8 $m^2/g$. The bulk sorbents either in single or mixed form were then prepared by a technique that resulted in high pore volume and surface area. Following a general procedure suggested in the literature (14), an aqueous solution of thermally decomposable metal salts in the desired proportion and an organic polyfunctional acid containing at least one hydroxy and at least one carboxylic function is rapidly dehydrated under vacuum at a temperature below 100° C. An amorphous solid foam forms which is calcined at an elevated temperature above 300° C., usually 500° C. to 600° C., to form a mixed oxide phase. The crystallized mixed oxides thus formed are homogeneous and highly porous.

bent had a surface area of 26 m²/g and consisted of CuO, $FeAl_2O_4$, $CuFe_2O_4$, and $Al_2O_3$ phases. Properties of these sorbents are found in the following table:

TABLE 4
CRYSTALLINE PHASES AND SURFACE AREA OF VARIOUS SORBENTS

| SORBENT | COMPOSITION (molar ratio) | PHASES (XRD) | BET SURFACE AREA (m²/g) |
|---|---|---|---|
| CM-3, fresh | $CuO:MoO_3:Al_2O_3$ 1:3.125:26.6 | N/A | 18.2 |
| CM-5, fresh | $CuO:MoO_3:Al_2O_3$ 1:1:1.1 | $Cu_3Mo_2O_9$, amorphous material | 6.2 |
| CM-5, sulfided | | $MoO_2$, $CuMoO_4$, $Cu_{1.96}S$, $Al_2O_3$, $CuAlS_x$ | N/A |
| ZF, fresh | $ZnO:Fe_2O_3$ 1:1 | $ZnFe_2O_4$ | 17.0 |
| ZF, sulfided (538° C., 6 cycles) | | $\beta$-ZnS, $Fe_{1-x}S$ | 3.0 |
| ZF, regenerated (700° C., 6 cycles) | | $ZnFe_2O_4$, $Fe_2O_3$, amorphous material (probably ZnO) | 6.0 |
| CF, fresh | $CuO:Fe_2O_3$ 1:1 | $CuFe_2O_4$ | 7.0 |
| CF, sulfided (538° C., 8 cycles) | | $CuFe_2O_4$, $Fe_3O_4$, $CuFeS_2$, $Fe_{1-x}S$, amorphous material | 1.2 |
| CF, sulfided (650° C., 2 cycles) | | $Fe_3O_4$, $CuFe_2O_4$, $Fe_{1-x}S$, amorphous material | 1.0 |
| CF, regenerated (700° C., 2 cycles) | | $Fe_2O_3$, CuO, $CuFe_2O_4$, amorphous material | 2.0 |
| CA, fresh | $CuO:Al_2O_3$ 1:1 | $CuAl_2O_4$, CuO | 12.0 |
| CA, sulfided (538° C., 5 cycles) | | $CuAl_2O_4$, $Cu_7S_4$, amorphous material | 4.2 |
| CA, regenerated (700° C., 4 cycles) | | CuO, $CuAl_2O_4$, amorphous material | N/A |
| CFA, fresh | $CuO:Fe_2O_3:Al_2O_3$ 2:1:1 | CuO, $CuFe_2O_4$, $FeAl_2O_4$, amorphous material | 26.0 |
| CFA, sulfided (650° C., 2 cycles) | | CuS, FeS, $CuFe_2S_3$, amorphous material | N/A |

The sorbent material prepared by the latter direct calcination technique has low density, a surface area above 15 m²/g and pore volume exceeding 1.5 cc/g. Scanning electron micrographs indicate the presence of large pores 1-20 μm in diameter and low angle XRD revealed that the solid was microcrystalline with average crystallite size of about 500-1000 Angstroms.

The porous mixed oxides contain one oxide of Group IB, IIB or VIIA metal such as copper, zinc or mananese and one or more oxides of a Group IIIA, VIII or VIB metal such as aluminum, iron or molybdenum. The presence of aluminum or iron oxides has an effect on the oxidation state allowing the Group IB, IIB or VIIA metal to remain in the oxidized state during sulfidation. Molybdenum addition in preselected amounts results in the formation of a eutectic at sulfidation temperature and improves the efficiency of the sorbents.

The above described method was used to prepare the bulk sorbents CF ($CuFe_2O_4$), ZF ($ZnFe_2O_4$), CA (CuAl ), CFA (Cu-Fe-Al-O), and CM (Cu-Mo-Al-O). All these materials were prepared as highly dispersed microcrystalline solids with very large ($\geq 10$ μm) as well as submicron size pores. The gross porous structure before and after sulfidation appears very similar. X-ray diffraction analysis showed that the mixed oxides $ZnO$-$Fe_2O_3$, and $CuO$-$Fe_2O_3$ had the ferrite spinel structure, $ZnFe_2O_4$ and $CuFe_2O_4$, respectively, while $CuO$-$Al_2O_3$ formed the aluminate spinel $CuAl_2O_4$. The CFA sorbent had a surface area of 26 m²/g and consisted of CuO, $FeAl_2O_4$, $CuFe_2O_4$, and $Al_2O_3$ phases.

The sorbents were loaded in a quartz microreactor (1 cm I.D.) as $-20+-40$ mesh particles mixed with low surface area zirconia or alumina particles, which served as an inert filler. The use of the inert particles allows compression of the experimental run time by decreasing the bed capacity, while maintaining the same space velocity.

The experiments consisted of alternating sulfidation and regeneration runs. In a sulfidation run the sulfur-free sorbent was exposed to a feed gas containing $H_2$ (15-20 percent), $H_2O$ (7-25 percent), $H_2S$ (0.2-1 percent) and $N_2$ (balance). The temperature was chosen in the range 500°-700° C. and was held fixed for the duration of sulfidation. Sulfided sorbents were regenerated using a nitrogen-air or a steam-air mixture at temperatures of 600°-700° C.

$ZnFe_2O_4$ Sorbents

Zinc ferrite is one of the most efficient $H_2S$ sorbents. Extensive lab and bench-scale tests with $ZnFe_2O_4$ have been performed at DOE/METC (5). The material used in that work was prepared by United Catalysts, Inc., by the conventional technique of high-temperature (>800° C.) heating of mixtures of the pure oxide powders. The surface area of this zinc ferrite, designated METC-ZF, is ~5 m²/g and its pore volume ~0.3 cc/g.

The performance of porous zinc ferrite (ZF-C) synthesized in this invention having high surface area and large pore size was tested in the quartz microreactor and compared to the METC-ZF sorbent at the same operating conditions. Both sorbents were used as −20+40 mesh particles mixed with low surface area alumina particles.

At 538° C. (1000° F.) sulfidation temperature, the stable pre-breakthrough conversion of ZF-C was >0.75, while that of METC-ZF was 0.35–0.40. Both sorbents were capable of removing $H_2S$ from ~2500 ppm to less than 1 ppm level with a feed gas containing 20 volume percent $H_2$ and 6.5 volume percent $H_2O$. The higher conversion of ZF-C must be attributed to its different physical properties. SEM micrographs of the sulfided ZF-C and METC-ZF sorbents show that the pore structure of the two is very different with METC-ZF lacking the large pores of ZF-C. The gross morphological features of the latter were the same before and after sulfidation which is indicative of high accessibility to $H_2S$ and limited or no pore mouth blocking.

Similarly high conversion (>0.75) was obtained with ZF-C at all temperatures 538° C. -650° C. and with the sulfidation gas containing 15–20 percent $H_2$, 7–25 percent $H_2O$, 0.2–1 percent $H_2S$, balance $N_2$ by volume. In sulfidation tests at temperatures >600° C., however, all zinc ferrite sorbents (ZF-C, METC-ZF) began to lose zinc (via reduction of ZnO). In deposits collected from the cooler part of the reactor tube, zinc was identified by Atomic Absorption (AA) analysis. Loss of zinc could not be prevented even with high $H_2O$ and low $H_2$ concentrations in the feed gas.

At 600° C., with 15 percent $H_2$, 25 percent $H_2O$, 1 percent $H_2S$, 59 percent $N_2$ by volume in the feed gas, the rate of evaporative Zn loss was 8 and 26 weight percent per 1000 hours at space velocities of 2100 and 6900 hr$^{-1}$, respectively. A slow decline in conversion was observed between the first and fourth cycles of sulfidation/regeneration.

$CuFe_2O_4$ Sorbents

Porous copper ferrite (CF) was prepared by the technique described earlier. $H_2S$ breakthrough curves in several sulfidation cycles at 538° C. showed that the pre-breakthrough sorbent conversion was high (~0.80) and stable (over 6 cycles). In all cases the pre-breakthrough $H_2S$ level was below the value of 44.5 ppm calculated for the equilibrium of metallic copper sulfidation.

$$2Cu + H_2S \rightarrow Cu_2S + H_2O \qquad (1)$$

In fact, the $H_2S$ level remained below 2 ppm until 0.5 conversion and then gradually increased to ~10 ppm when the conversion reached 0.78. One possible explanation for such sub-equilibrium concentrations is $H_2S$ chemisorption to form a surface sulfide layer with substantially lower free energy than the bulk sulfide.

In two sulfidation-regeneration cycles carried out at 600° C., sub-equilibrium $H_2S$ levels were again measured till breakthrough, which occurred at ~0.80 sorbent conversion. At 650° C. sulfidation temperature, however, while a similarly high and stable sorbent conversion took place, the pre-breakthrough $H_2S$ level at 0.80 sorbent conversion was 85–90 ppm, close to the equilibrium for reaction (1). Up to ~0.20 sorbent conversion, sub-equilibrium $H_2S$ levels were measured, again indicative of chemisorption effects.

Characterization of fresh, sulfided and regenerated samples of CF-sorbents was performed by SEM and XRD analyses. The gross porous structure of the sorbent before and after sulfidation appeared very similar in SEM (as in the case of zinc ferrite). XRD analysis of the sorbent sulfided at 538° C. identified the mixed sulfide compound $CuFeS_2$ (chalcopyrite) along with $Fe_{1-x}S$, $Fe_3O_4$, unconverted $CuFe_2O_4$ and some amorphous material. In the sample sulfided at 650° C., the phase $CuFeS_2$ was absent, while there was indication of a poorly crystalline $Cu_2S$ phase.

These results suggest that at 538–600° C. sulfidation temperatures the reduction of CuO is suppressed in the ferrite-spinel. The presence of $CuFeS_2$ in the sample sulfided at 538° C. along with the observed $H_2S$ pre-breakthrough levels correspond to the sulfidation reaction:

$$CuFeO_2 + H_2S \rightleftharpoons CuFeS_2 + H_2O \qquad (2)$$

The intermediate compound $CuFeO_2$ indicates a stepwise reduction of $CuFe_2O_4$. The equilibrium $H_2S$ levels for the above reaction were calculated by using thermodynamic values for the compound $Cu_2O.Fe_2O_3$ (25). These are in agreement with the experimental $H_2S$ levels, and much below the values for metallic copper sulfidation. At the higher sulfidation temperature of 650° C., reduction to metallic copper is very fast, and controls the pre-breakthrough levels of $H_2S$ after an initial sorbent conversion (0.15–0.20) at sub-equilibrium $H_2S$ exit levels.

$CuAl_2O_4$ Sorbents

The stability of porous copper aluminate (CA) of the spinel crystal structure was investigated in a series of sulfidation/regeneration tests at 538°–650° C. The results were very similar to copper ferrite. Thus at 538°–600° C., the $H_2S$ pre-breakthrough levels were below the equilibrium for copper sulfidation reaction (1), and high (>0.75, based on $Cu_2S$) and stable (over 5–6 cycles) sorbent conversion was observed. Copper in the +2 or +1 oxidation state was apparently stabilized in the alumina matrix and controlled the exit level of $H_2S$ till breakthrough. At 650° C., the $H_2S$ exit levels after ~0.20 sorbent conversion corresponded to sulfidation of metallic copper. With copper aluminate, however, structural changes that occurred at 650° C. were reversed when the temperature was lowered to 538° C. This was not true with copper ferrite sorbents.

Mixed Cu-Fe-Al-O (CFA) Sorbents

Figure 5:
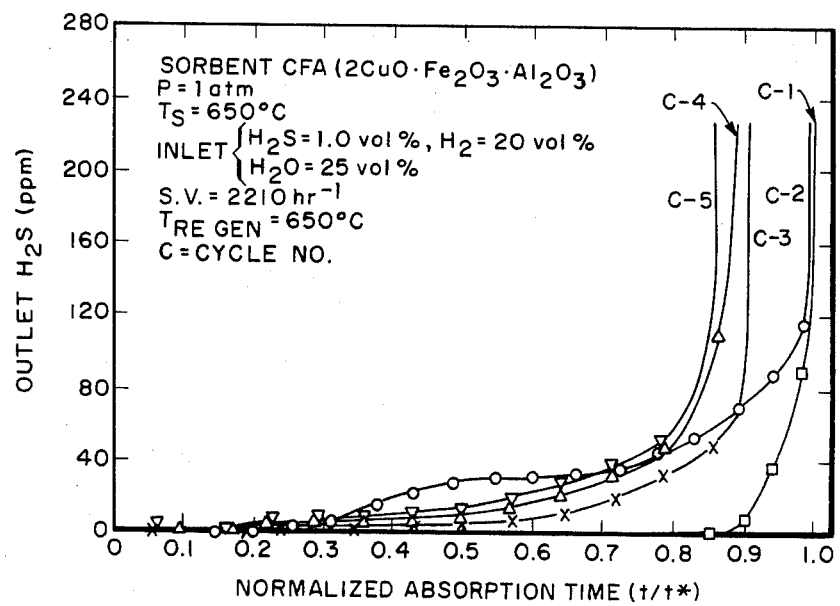
FIG. 5 is a set of breakthrough curves in successive sulfidation cycles of sorbent CFA (2 $CuO \cdot Fe_2O_3 \cdot Al_2O_3$) at 650° C.

In view of the enhanced stabilization of copper oxide in copper aluminate sorbents, a mixed copper ferrite-copper aluminate material, CFA, with $2CuO:Fe_2O_3:Al_2O_3$ molar ratio was prepared in porous bulk form (with 26 m$^2$/g surface area) as a potential sorbent for higher (>600° C.) temperature $H_2S$ removal. Under similar operating conditions, this sorbent was superior to either copper ferrite or copper aluminate in regard to pre-breakthrough $H_2S$ levels, which were lower than the equilibrium of copper sulfidation reaction (1) at all temperatures, 538° C.–650° C. An example is shown in FIG. 5 for 650° C. sulfidation temperature. XRD analysis of the fresh and sulfided (after cycle 4) CFA sorbent was performed to identify stable crystalline phases that may be responsible for the improved performance of this sorbent. The fresh CFA consisted of $CuFe_2O_4$, CuO, $FeAl_2O_4$ and some amorphous material (probably $Al_2O_3$), with $FeAl_2O_4$ (iron aluminate) in highly microcrystalline form. The sulfided sample contained CuS, FeS and $CuFe_2S_3$ along with amorphous (to XRD) alumina. These results are very important, indicative of stabilization of both $Cu^{2+}$ and $Fe^{2+}$ in the sorbent matrix and associated improved absorption equilibria.

Additional testing of the stability and performance of the CFA sorbent was conducted at the higher temperature of 830° C. with a reactant mixture containing 30 volume percent $H_2$, 17 volume percent $H_2O$, 1 volume percent $H_2S$, balance $N_2$, simulating the Texaco gasifier-fuel gas. Breakthrough of $H_2S$ took place at complete (100 percent) sorbent conversion, while the pre-breakthrough $H_2S$ level was zero up to ~0.20 sorbent conversion and ~270 ppm until final breakthrough.

A summary of sulfidation tests with the ZF, CF, CA and CFA sorbents is presented in the following table:

loss of a molybdenum compound. Other preparations of Cu-Mo-Al-O sorbents were then made in porous bulk form with progressively lower Mo-content to eliminate the molybdenum-loss problem. All sorbents were capable of removing $H_2S$ to <0.5 ppm level and high sorbent conversions (0.5–1.20 based on copper) at breakthrough were typically observed.

Sorbent CM-3 with a molar ratio of $CuO:MoO_3:Al_2O_3 = 1:3.125:26.6$, was prepared in dispersed form according to the technique described previously. The aluminum component was introduced in the precursor salt solution in the form of aluminum nitrate.

Sulfidation tests with CM-3 were conducted at 538° C. with inlet gas molar composition of 20 percent $H_2$, 25 percent $H_2O$, 54 percent $N_2$, and 1 percent $H_2S$. Regeneration was carried out with a 70 percent $N_2$-30 percent air mixture. The $H_2S$ breakthrough curves in two cycles show pre-breakthrough through $H_2S$ levels nearly zero as achieved with the supported CM-2 sorbents. The sorbent conversion (based on Cu alone) was quite high (75 to 80 percent).

At the end of each sulfidation the appearance of the sorbent through the quartz reactor walls indicated the formation of a molten phase during reaction which could have retained additional amounts of $H_2S$. As with

TABLE 5
SULFIDATION TESTS WITH SORBENTS ZF, CF, CA AND CFA

| SORBENT | $T_s$ (°C.) | FEED GAS COMPOSITION (mol %) | PRE-BREAK-THROUGH $H_2S$ (ppm) | BREAKTHROUGH SORBENT CONVERSION+ (t/t*) | SULFUR LOADING ($\frac{gS}{g\ sorbent}$) |
|---|---|---|---|---|---|
| ZF Zinc Ferrite | 600 | 15 $H_2$, 25 $H_2O$, 1 $H_2S$, 59 $N_2$ | 3 | 0.80* | 0.318 |
| CF Bulk Copper Ferrite | 538 | 20 $H_2$, 6.8 $H_2O$ 0.26 $H_2S$, 72.94 $N_2$ | 5–10 | 0.80 | 0.267 |
| | 650 | | 90 | 0.90 | 0.300 |
| | 600 | 15 $H_2$, 25 $H_2O$ 1 $H_2S$, 59 $N_2$ | 38 | 0.80 | 0.267 |
| CA Bulk Copper Aluminate | 538 | 20 $H_2$, 25 $H_2O$ 1 $H_2S$, 54 $N_2$ | <10 | 0.75 | 0.066 |
| | 650 | | 100 | 0.80 | 0.070 |
| CFA Mixed Copper Ferrite-Copper Aluminate | 538 | 20 $H_2$, 25 $H_2O$ 1 $H_2S$, 54 $N_2$ | <0.5 | 0.60 | 0.137 |
| | 600 | 15 $H_2$, 25 $H_2O$ 0.5 $H_2S$, 59.5 $N_2$ | 25 | 0.60 | 0.137 |
| | 650 | | 50 | 0.65 | 0.148 |
| | 830 | 30 $H_2$, 17 $H_2O$ 1 $H_2S$, 52 $N_2$ | 250 | 1.00 | 0.228 |

+Based on the active sorbent components.
*The ratio t/t* showed a gradual decrease in successive cycles.

Mixed Cu-Mo-Al-O (CM) Sorbents

Previously described sulfidation tests with CM-2, an alumina-supported mixture of $CuMoO_4:MoO_3$ (=0.47/1 molar) which forms a eutectic at 560° C. (10), showed that this material was capable of complete $H_2S$ removal (to less than 0.5 ppm level) in the temperature range of 538°–650° C., under typical sulfidation conditions. The only limitation appeared to be evaporative the CM-2 supported sorbent, limited loss of molybdenum was observed during sulfidation of CM-3. This prompted the preparation of the CM-5 sorbent, described below, with lower $MoO_3$ content.

CM-5 sorbent was prepared in dispersed form with a molar ratio of $CuMoO_4/Al_2O_3 = 1/1.1$, as a potential improvement over sorbent CM-3 (to eliminate the molybdenum loss). XRD analysis of the fresh sorbent identified $Cu_3Mo_2O_9$ in the crystalline phase, while the remaining $MoO_3$ and the $Al_2O_3$ were in a phase amorphous to XRD (Table 4).

Sulfidation tests with CM-5 were conducted at 538° C. and 650° C. The inlet gas molar composition was 15 percent $H_2$, 59.5 percent $N_2$, 25 percent $H_2O$ and 0.5 percent $H_2S$. Regeneration was carried out with a 90 percent $N_2$-10 percent air mixture. The temperature at the beginning of regeneration was 538° C., then was raised to 650° C.

Figure 6:
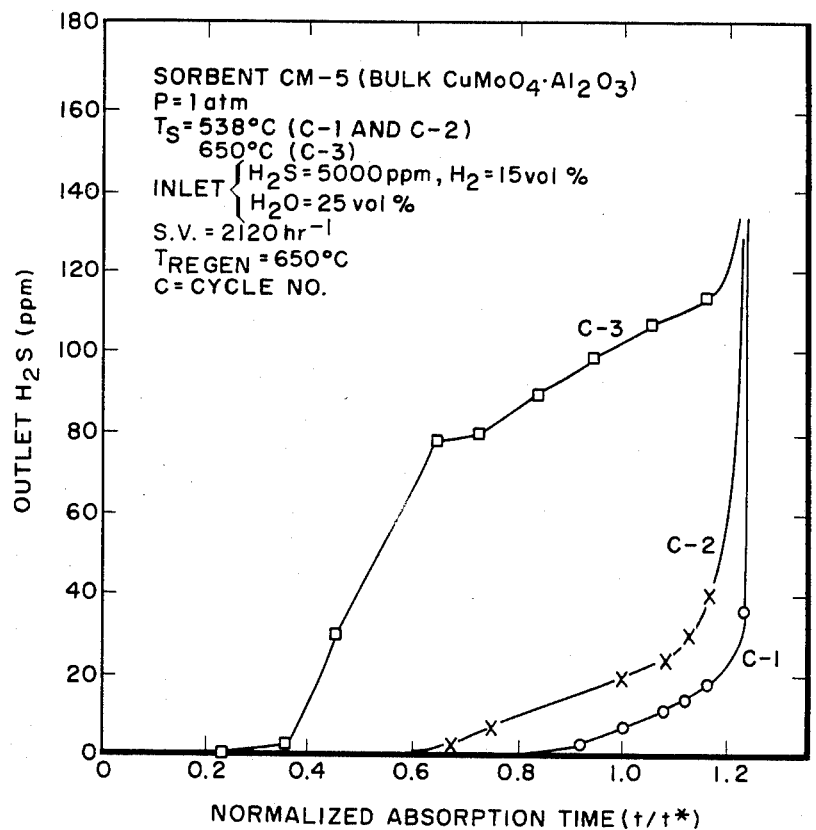
FIG. 6 is a set of breakthrough curves in successive sulfidation cycles of bulk CM-5 sorbent ($CuMoO_4$: $Al_2O_3$=1:1.1, molar) at 538° C. and 650° C.

The $H_2S$ breakthrough curves obtained for sorbent CM-5 are presented in FIG. 6. As can be seen from this figure, the $H_2S$ level in cycle 1 was close to zero till nearly complete sorbent conversion based on Cu alone. The sorbent continued to be active even after complete theoretical conversion of copper, possibly due to molybdenum contribution. The final $H_2S$ breakthrough at ~10 ppm took place at a sorbent conversion of about 1.20 (based on copper). Direct observation of the sorbent through the quartz reactor wall again indicated the formation of a molten phase during sulfidation. Perhaps a complex sulfide containing eutectic mixture of copper molybdates is formed during sulfidation. As discussed above for CM-3, this phase may explain the sub-equilibrium $H_2S$ levels observed throughout the sulfidation of Cu-Mo based sorbents.

The second sulfidation cycle at 538° C., FIG. 6, gave a slightly lower pre-breakthrough sorbent conversion (~1.15 based on copper) and ~20 ppm $H_2S$ level. This behavior, typical of all unsupported sorbents, can be attributed to limited sintering (loss of surface area) and structural rearrangement particularly during the higher temperature (650° C.) regeneration conditions. The interesting finding from both sulfidation-regeneration cycles with CM-5 is that no molybdenum loss took place. Thus, the CM-5 composition provided the necessary improvement over CM-3, which contained excess $MoO_3$.

In a third cycle with CM5, the sulfidation temperature was raised to 650° C. The corresponding $H_2S$ breakthrough curve, shown in FIG. 6, has some interesting characteristics. First, zero $H_2S$ breakthrough up to ~0.40 sorbent conversion was observed. Thereafter, the $H_2S$ level increased slowly to ~90 ppm at sorbent conversion of 0.70 (based on copper), and to ~110 ppm before the final (third) breakthrough at sorbent conversion of 1.20. The three segments of the breakthrough curve of FIG. 6 are indicative of different sulfidation mechanisms, the first being the most important with zero $H_2S$ level.

A sample of the CM-5 sorbent sulfided at 650° C. was analyzed by XRD. The material had high crystallinity and contained some $Cu_xS$, little unconverted $CuMoO_4$, and $Al_2O_3$ (Table 4). Its major components were $MoO_2$ and an unidentified complex phase of $CuAlS_x$ containing some Mo). Further characterization is clearly necessary to elucidate the sulfidation mechanism in this complex sorbent. At the end of sulfidation, a thin deposit layer was observed on the reactor wall downstream of the bed indicating that loss of molybdenum had taken place from this sorbent at 650° C.

The sorbents of this invention have shown improvements (higher sulfur capacity, limited surface area loss, high stability and good regenerability) that can be attributed to their improved physical characteristics. In addition, improved thermodynamic sorbent properties have been identified indicative of synergistic chemical effects in the mixed oxide sorbent formulations.

Supported Zn-V-O, Cu-Mo-O sorbents prepared according to the invention by impregnation of high surface area alumina (80–90 m²/g) to a loading of 5–30 weight percent show the following advantages:

Enhancement of reaction rates due to the initial molten phase and subsequent high dispersion of the crystalline phases formed.

Very high $H_2S$ removal efficiency (>99.99 percent), which translates to pre-breakthrough $H_2S$ levels of <0.5 ppm.

Synergistic effects—better thermodynamic equilibria than for each oxide alone.

Stabilization of ZnO (no zinc loss).

Limited molybdenum loss from Cu-Mo sorbents at >600° C. may be avoided by careful choice of Cu/Mo ratio in the sorbent.

Fully regenerable sorbents; no loss of surface area.

No sulfate formation in regeneration (at 700° C).

Mixed metal oxide sorbents prepared via pyrolysis of homogenous organic precursors as highly dispersed solids (SA>10 m²/g, pore volume ~2.0 cc/g) show the following improvement over conventional sintered materials:

(a) Rapid sulfidation rates; sharp $H_2S$ elution profiles.
(b) High (>70 percent) and stable breakthrough sorbent conversion.
(c) No pore plugging.
(d) Complete regeneration.

A comparative evaluation of the performance of certain porous mixed oxide sorbents is given below in terms of sulfidation temperatures (for 25 volume percent $H_2O$, 20 volume percent $H_2$, 1 volume percent $H_2S$, balance $N_2$ in the feed gas).

At 538° C. (1000° F.), the porous $ZnFe_2O_4$, Cu-Fe-Al-O (CFA) and Cu-Mo-Al-O (CM) sorbents are all very efficient for $H_2S$ removal from 0.5–1.0 volume percent in the feed gas to 1–5 ppm breakthrough levels (at 70–75 percent sorbent breakthrough conversion). With CuO-containing sorbents, reduction to metallic copper is suppressed as indicated by the pre-breakthrough $H_2S$ levels, which are well below those corresponding to metallic copper sulfidation. Intermediate compounds retaining copper in the +2 oxidation state are inferred from the data.

At 600° C. (1112° F.), $ZnFe_2O_4$, while still very efficient for $H_2S$ removal, shows zinc metal loss in the vapor amounting to at least 8 weight percent Zn/1000 hours even with reduced (15 volume percent) $H_2$ content in the feed gas.

$CuFe_2O_4$, CFA at the same conditions show very high (>60 percent) and stable sorbent conversion at 35 ppm $H_2S$ breakthrough, which is lower than the metallic copper sulfidation equilibrium.

CM-sorbents exhibit very high H$_2$S removal efficiency (to <0.5 ppm level) that may be due to the formation of complex sulfide and oxide eutectics with high absorptive capacity.

At 650° C. (1200° F.), the operating temperature of molten carbonate fuel cells, ZnFe$_2$O$_4$ was excluded from use because of much higher Zn metal losses at this temperature.

CuFe$_2$O$_4$ shows high (>60 percent) and stable sorbent conversion at ~85 ppm H$_2$S breakthrough level, which now corresponds to metallic copper sulfidation equilibrium. Evidently, at this temperature reduction of CuO→Cu precedes sulfidation.

CFA (Cu-Fe-Al-O) shows high (>75 percent) and stable sorbent conversion with pre-breakthrough H$_2$S levels in the range of 0–10 ppm up to 0.50 sorbent conversion and less than ~35 ppm at breakthrough.

From this evaluation, therefore, the porous CFA sorbent is considered to be the most attractive for H$_2$S removal at 650° C. or higher temperatures. Because of its alumina content, this sorbent may be expected to also possess better attrition-resistance (mechanical strength) in practical applications.

Mixed Cu-Fe-Al-O (CFA) or Cu-Mo-Al-O (CM) sorbents exhibit much higher H$_2$S removal efficiency than each of the pure constituents alone. Either CFA alone or CFA mixed with CM in a single stage are projected as very efficient sorbents for H$_2$S removal at 650° C. for molten carbonate fuel cells or gas turbine applications. The sorbents of the invention will also find use in SO$_2$ removal from combustion gases or smelter gases.

It is to be realized that only preferred embodiments of the invention have been described and that numerous substitutions, modifications and alterations are permissible without departing from the spirit and scope of the invention as defined in the following claims.

We claim:

1. A composition of matter in the form of porous particles consisting essentially of a refractory metal oxide support containing a layer of a binary metal oxide mixture of a first Group VB or VIB metal oxide and a second Group IB, IIB or VIII metal oxide, said oxides being present in the mixture such that the ratio of the metal oxide of the first group to the metal oxide of the second group is within ±5 percent of the atomic ratio of the metal oxide of the first group to the metal oxide of the second group at the eutectic point and said layer being molten at a temperature from 400° C. to 750° C.

2. A composition according to claim 1 in which the refractory support is selected from alumina or zirconia.

3. A composition according to claim 2 in which the binary oxide mixture layer is present on the support in an amount from 5 to 60 percent by weight.

4. A composition according to claim 2 in which the binary metal oxides mixtures are selected from V-Zn-O, V-Cu-O, Cu-Mo-O, Zn-Mo-O or Fe-Mo-O.

5. A composition according to claim 4 in which binary metal oxides mixtures are selected from ZnO/V$_2$O$_5$, CuO/V$_2$O$_5$, ZnMoO$_4$/MoO$_3$, CuMoO$_4$/MoO$_3$ or FeMoO$_4$/MoO$_3$.

6. A composition according to claim 2 in which more than 50 percent of the pores in the refractory support have a diameter exceeding about 100 Angstroms.

7. A composition of matter consisting essentially of porous, unsupported particles including highly dispersed microcrystalline solids of mixed oxides of a copper or manganese oxide with at least one oxide selected from an aluminum, iron, or molybdenum oxide, said particles having a surface area from 15 to 100 m$^2$/g and a pore volume from 1–3 cc/g.

8. A composition according to claim 7 in which the porous, mixed oxides are selected from Cu-Fe-O, Cu-(Al,Fe)-O or Cu(Mo,Al)-O.

9. A composition according to claim 7 in which the mixed oxide particles contain pores having a diameter ranging from 1 to 20.

10. A composition according to claim 7 in which the mixed oxides are selected from CuFe$_2$O$_4$, CuAl$_2$O$_4$, Cu-Fe-Al-O and Cu-Mo-Al-O.

* * * * *

UNITED STATES PATENT AND TRADEMARK OFFICE
CERTIFICATE OF CORRECTION

PATENT NO. : 4,729,889
DATED : March 8, 1988
INVENTOR(S) : Maria Flytzani-Stephanopoulos et al It is certified that error appears in the above-identified patent and that said Letters Patent are hereby corrected as shown below:

Item [19] and Inventors [75] correct "Flytzani"

Abstract (57, line 12, change "of", second occurrence, to --or--

Column 2, line 38, omit "determined"

Column 2, line 68, change "sufur" to --sulfur--

Column 4, line 15, correct spelling of "regenerability"

Column 4, lines 27-28, after "oxides", add --must--

Column 4, line 40, correct spelling of "chemisorb"

Column 4, line 65, change "The" to --This--

Column 8, Table 3, in the subheading after "Support", add -- + --

Column 8, Table 3, in the penultimate line, before "See" add -- + --

Column 13, line 47, correct spelling of "manganese"

Column 13, lines 58-59, change "(CuAl)" to --$(CuAl_2O_4)$--

Column 14, line 38, change "-20+-40" to -- -20+40--

Signed and Sealed this

Ninth Day of August, 1988

Attest:

DONALD J. QUIGG

Attesting Officer      Commissioner of Patents and Trademarks